T. H. HAMILTON.
FLOATING DRY DOCK.
APPLICATION FILED SEPT. 17, 1917. RENEWED SEPT. 7, 1918.
1,335,497.
Patented Mar. 30, 1920.
3 SHEETS—SHEET 1.
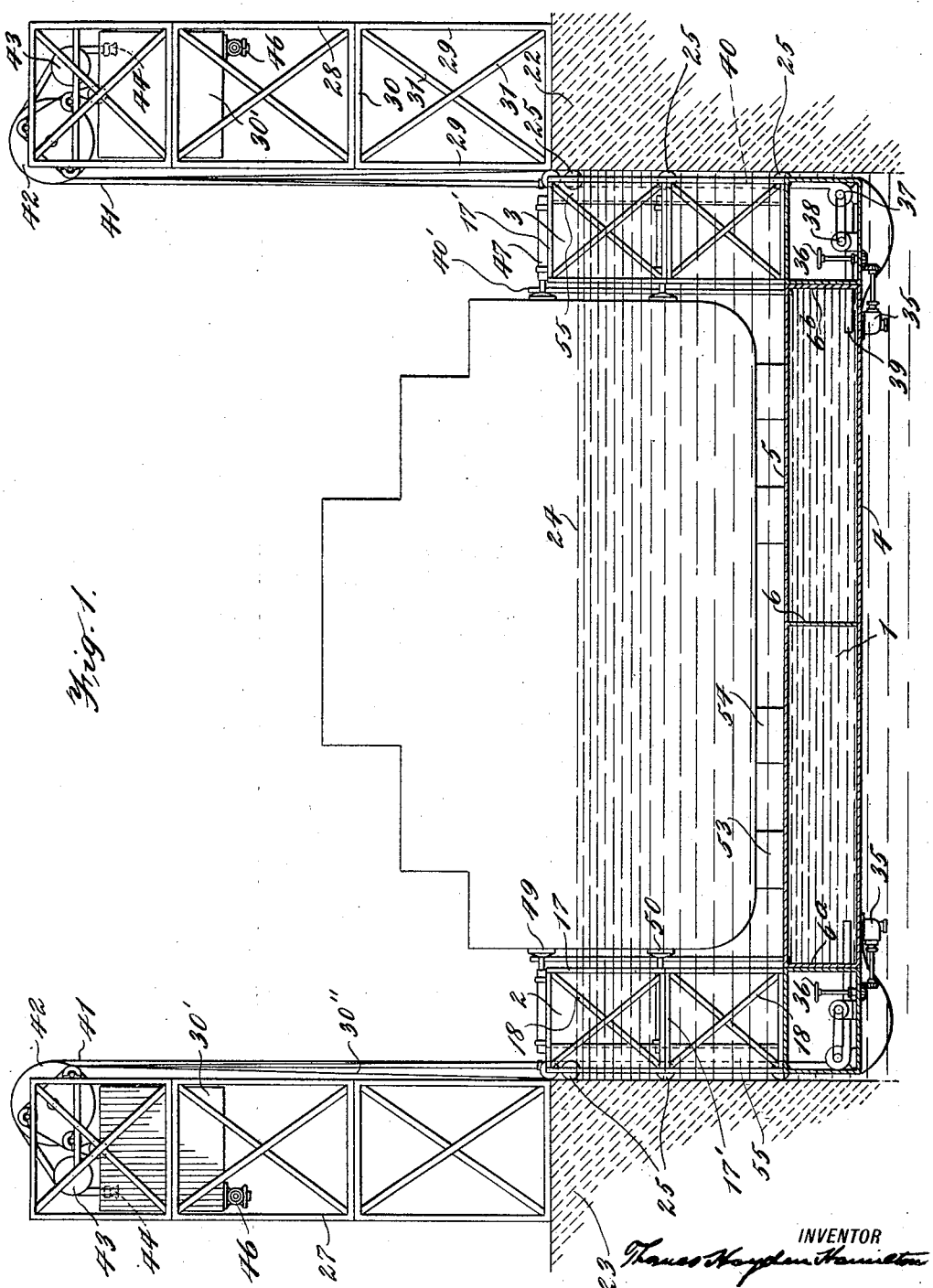

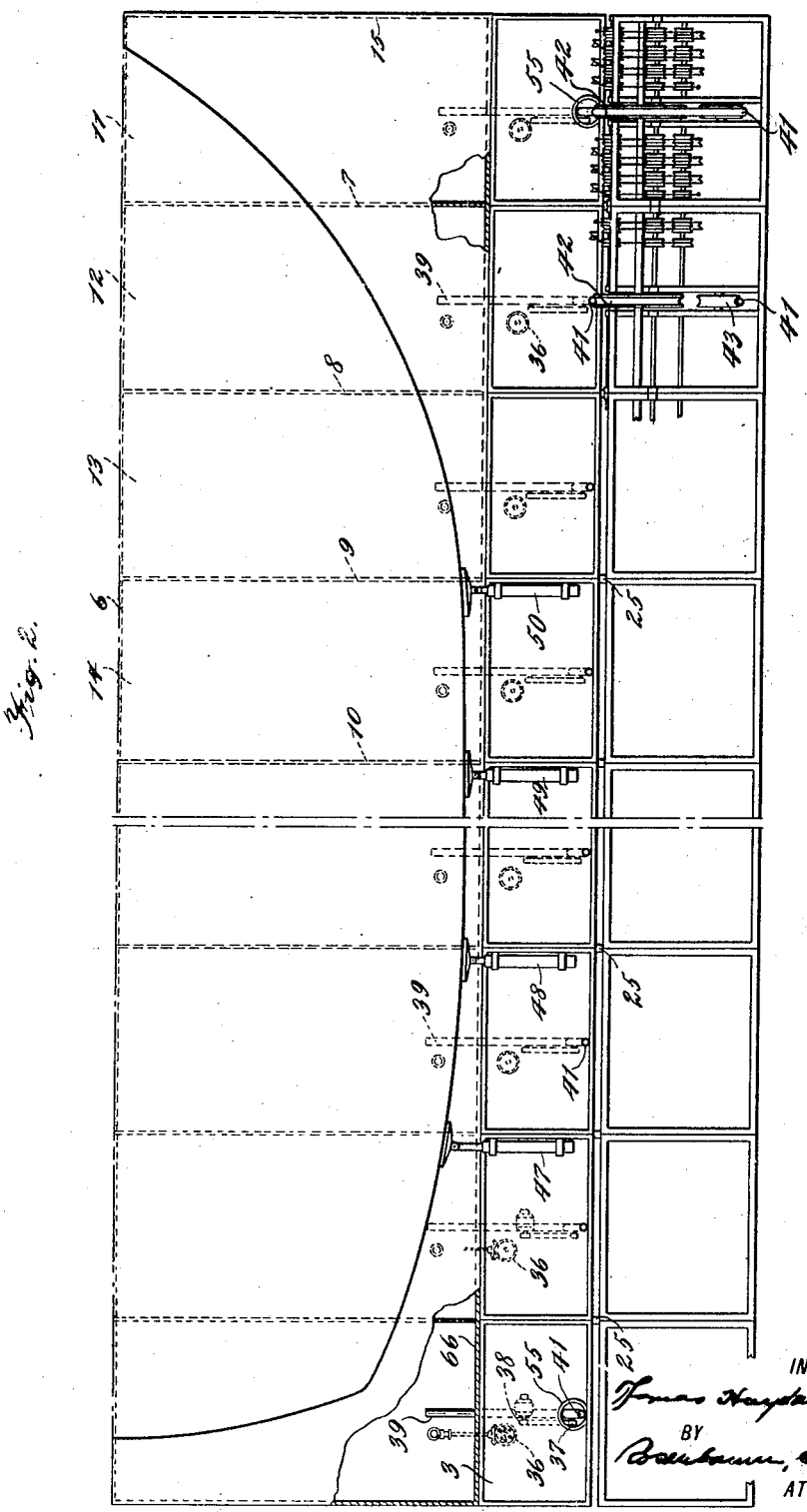

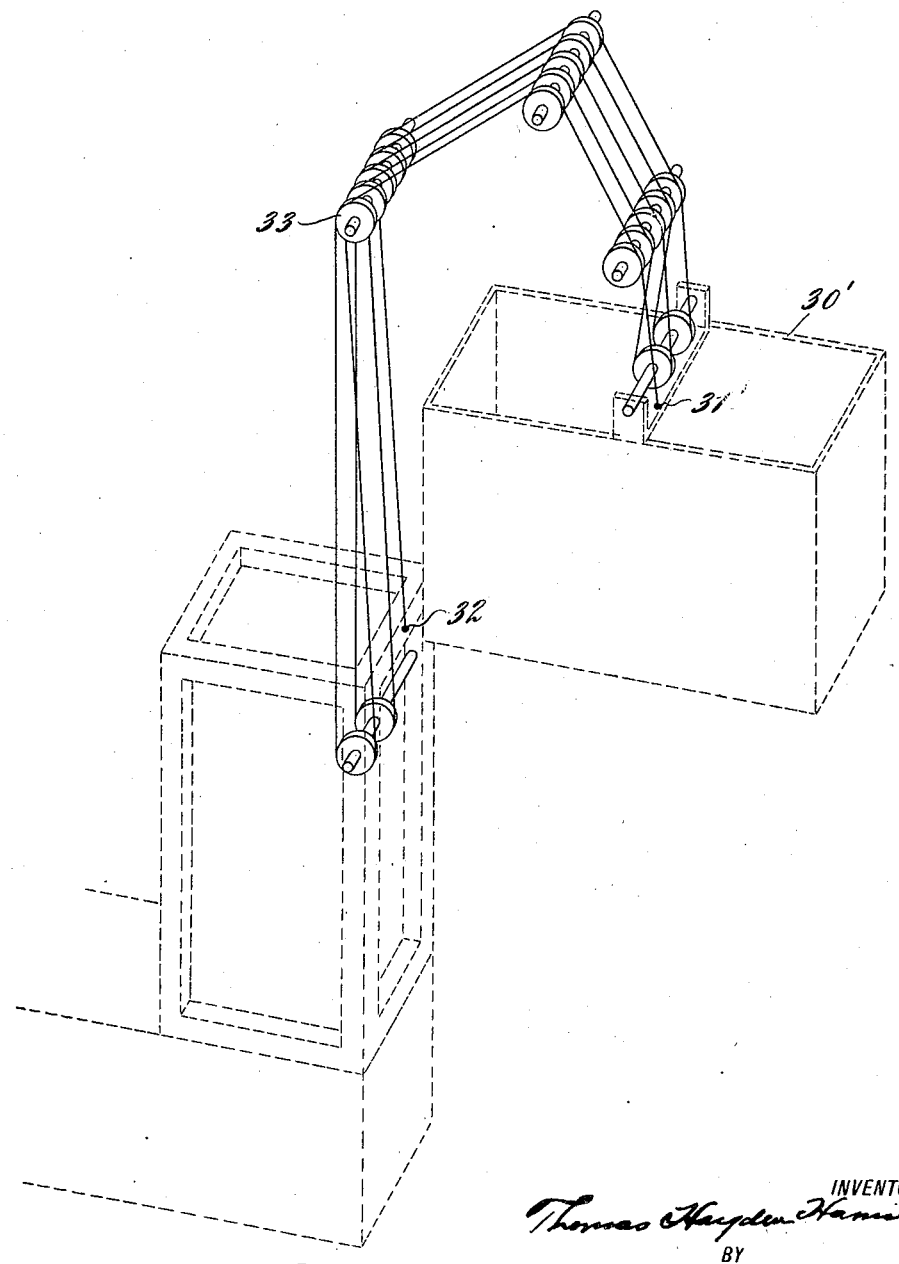

UNITED STATES PATENT OFFICE.

THOMAS HAYDEN HAMILTON, OF NEW YORK, N. Y.

FLOATING DRY-DOCK.

1,335,497.  Specification of Letters Patent.  Patented Mar. 30, 1920.

Application filed September 17, 1917, Serial No. 191,714. Renewed September 7, 1918. Serial No. 253,078.

*To all whom it may concern:*

Be it known that I, THOMAS HAYDEN HAMILTON, a citizen of the United States, residing at the city of New York, in the borough of Manhattan and State of New York, have invented certain new and useful Improvements in Floating Dry-Docks, of which the following is a full, clear, and exact description.

This invention relates to floating dry docks; *i. e.*, to a dock which may be lowered to permit the vessel to enter the same and may then be raised to lift the vessel out of the water so that it can be overhauled.

Floating dry docks having these general characteristics are in common use and the invention resides primarily in the provision of means for raising the dock after the vessel has entered the same. Heretofore it has been the common practice to raise the dock by pumping the water from the caissons or compartments forming a part of the dock-structure until the dock is sufficiently buoyant to cause it to rise and float on the surface of the water carrying the vessel with it. The vessel within the dock is then overhauled and the dock is again sunk by permitting the caissons to fill with water. In this form of construction the buoyancy of the floating dry dock is depended upon entirely to cause the dock to float, and the object of this invention is to provide a dock which will be more quickly and positively brought to the surface of the water.

To accomplish this object, the invention contemplates the provision of counterweights or balances that are attached to the floating dry dock. The counterbalances consist of tanks which are filled with water or other liquid by suitable means when the water or other liquid is discharged from the caissons or compartments in the dock. The dock, therefore, rises not only due to its increased buoyancy caused by the formation of air chambers therein as the water is pumped out of the caissons, but also by the lifting force which is provided by the weight of water as the counterbalancing tanks become filled.

The specific constructions whereby the counterbalancing of the dock is obtained form no essential part of the present invention, but for illustration a dry dock is shown which constitutes one embodiment of the invention, the invention consisting of the combinations and constructions set forth in the detailed description and particularly pointed out in the claims appended hereto.

In the drawings:

Figure 1 shows a transverse sectional view through a dock constructed in accordance with the principles of the invention.

Fig. 2 is a plan of one-half of the dock; and

Fig. 3 is a diagrammatic view showing one form of attachment between the counterbalanced tank and the dry dock.

In the embodiment of the invention shown the dry dock comprises a bottom 1 and side structures 2 and 3. The bottom of the dry dock comprises a huge flat tank having top and bottom walls 4 and 5 with partitions therebetween dividing it into separate water-tight compartments. The partition which is indicated 6, is preferably medially disposed and extends longitudinally of the structure, while partitions 6$^a$ and 6$^b$ are longitudinal partitions adjacent the side walls of the bottom. The other partitions indicated 7, 8, 9, etc., divide the bottom transversely and with the partitions 6, 6$^a$ and 6$^b$ provide a series of water-tight compartments, the space between the side walls of the bottom and the partitions 6$^a$ and 6$^b$ providing permanent air chambers, the purpose of which will be later described. If desired, instead of making the dry dock in one unit, the dry dock may consist of sections, and in Fig. 2 one section is shown consisting of the water-tight compartments 11, 12, 13 and 14, the end walls of the sections being designated 10 and 15, respectively. In Fig. 2, since only one-half of the section is shown, it is to be understood that there are other compartments opposite each of the compartments 11, 12, etc., of the same shape and size.

The side structures of the dock which have been indicated 2 and 3 consist of a plurality of skeleton frame-works one for each of the compartments 11, 12, etc., and each comprising four corner uprights 17 which are connected by horizontals 17' and are braced by cross-struts 18 so as to provide a vertically disposed hollow rectangular skeleton frame-work.

The dock is supported in position by concrete walls or abutments 22 and 23 which extend above the water level as is indicated as at 24. Rollers 25 mounted on the skeleton frame-works 2 and 3 bear against the inner vertical faces of the concrete walls and serve as guides for the dock as it is raised or lowered.

The concrete walls or abutments 22 and 23 also serve as foundations for a series of skeleton frame-works 27 and 28, each of which is arranged opposite one of the side frame-works, and is similarly constructed and consists of four uprights 29 which are joined together by horizontals 30 and diagonal cross-pieces 31 to provide a rigid hollow rectangular structure. Mounted within each one of the vertical frame-works 27 and 28 (see Fig. 1) and adapted to slide up and down therein, is a counterbalance tank 30' each of which tanks is adapted to receive the water from one of the compartments 11, 12, 13, etc. Each counterbalance tank 30' is connected by a cable to one of the side frame-works of the dock by means of a cable 30'', one end of which 31' is attached to the tank and the other end 32 is attached to the side structure, the cable running backward and forward over a system of pulleys or sheaves 33 as is disclosed diagrammatically in Fig. 3.

The compartments 11, 12 etc., of the dock are adapted to be opened to permit the water to flow into these compartments by valves 35 which are controlled in any suitable manner as by handles 36, which handles are preferably located in the permanent air chambers at the sides of the bottom of the dock which are formed between the side walls and the partitions 6ᵃ and 6ᵇ. The water from each compartment is drawn from it by means of a pump 37 which is driven by a motor 38 located in the permanent air chambers, the pump 37 being connected to an intake pipe 39 which extends into the compartment and also to a discharge pipe 40 which extends vertically upwardly through the end chambers in the bottom of the dock through the skeleton side structures of the dock and along the side of the tank supports. The upper end 41 of each of the pipes 40 is preferably made flexible and runs over a large pulley 42 and a small pulley 43, the extreme end of the pipe being secured within the counterbalance tank 30' as at 44. The water which is therefore drawn by the pump through intake pipe 39 is discharged through the outlet pipe 40 into one of the counterbalancing tanks. Each of the counterbalancing tanks is also provided with an outlet valve 46 by means of which the tank may be emptied when it is desired to sink the dock for the purpose of admitting a vessel therein. Each of the side structures 2 and 3 of the dock are also provided with hydraulic jacks 47, 48, 49, 50, etc., which, after the vessel has entered the dock, are actuated to press against the sides of the vessel and to rigidly support the vessel and prevent it from overturning. The bottom of the vessel is supported upon the bottom of the dry dock by means of blocks 53, 54, etc., as is the usual custom. An air vent pipe 40' is provided for each of the compartments 11, 12 etc., to permit the air to flow in as the water is pumped out. Wells 55 are also provided leading to the permanent air chambers which wells extend above the water level when the dock is sunk so that access may be had at all times to the air chambers to control the operation of the valves and pumps.

The manner in which the dock is used is obvious from the previous description, but will be briefly described. When it is desired to sink the dock, the valves 35 of each of the compartments 11, 12, 13, etc., are opened by manipulating the handles 36. The water then flows into the compartments and the dock slowly sinks until it is in the position shown in Fig. 1. The vessel to be overhauled is then floated into the dock in the usual manner after the dock has been sunk to the necessary depth. The valve 35 of each compartment and the valve 46 of each of the counterbalancing tanks are closed and the pumps 38 set in operation which will cause the water drawn from each of the compartments through the intake pipe 39 to be discharged through the outlet pipes 40 into one of the counterbalancing tanks 30. The removal of the water from the compartments 11, 12, etc., will provide air chambers thus increasing the buoyancy of the dock and aiding the same to rise. The raising of the dock is expedited by the lifting force exerted upon it due to the weight of the water which is pumped into the counterbalancing tanks. During the upward movement of the dock, the rollers 25 ride against the concrete abutments which guide the dock to aid against overturning of the dock, and as the dock moves upward these rollers engage the vertical uprights 29 of the supporting structures for the counterbalancing tanks which will also tend to hold the dock against overturning.

To lower the dock, it is only necessary to open the valves 35 of the compartments and the valves 46 of each of the counterbalancing tanks. The water rushing into the compartments soon causes the dock to sink as the counterbalancing weight is removed when the water is discharged through the valves 46.

It is also to be noted that the permanent air chambers not only serve as operating chambers in which the pumps and motors are located, but also have an important function in preserving the equilibrium of the dock especially when the vessel is in place therein. As is well known, the dock and vessel when raised have a high center of gravity and therefore the liability of the dock to overturn is great, which is prevented by the permanent air chambers at the sides of the dock which will serve to balance the structure aided by the weight of the tanks 30.

In practice it has been deemed preferable to design the structure so that the weight of the counter-balancing tanks and the size of the permanent air chambers at the sides of the dock are such that these two factors combine to almost counterbalance the dock when the compartments 11, 12, etc., are filled with water, the dock, however, being heavier under these conditions to permit it to sink. When, therefore, the vessel is within the dock and the pumps started, the water which is pumped from the compartments into the counterbalancing tank is used almost entirely for the purpose of raising the vessel, since the dock structure is almost counterbalanced and only a small quantity of water need be pumped to insure that the dock will rise.

It is to be understood that the invention is not limited to the specific embodiment of the invention described but is limited only by the scope of the claims appended hereto.

I claim:

1. In a dry dock construction, a floating dry dock having a caisson, a counterbalancing tank attached to said dock, and means for pumping a liquid from said caisson into said tank.

2. In a dry dock construction, a floating dock having a caisson, a counterbalancing tank attached to said dock, means for admitting water to said caisson, means for discharging water from said tank, and means for pumping water from said caisson into said tank.

3. In a dry dock construction, a floating dry dock having a caisson, a valve for admitting water to said caisson, a counterbalancing tank, a discharge valve for said tank, and means for pumping water from said caisson into said counterbalancing tank.

4. In a dry dock construction, a floating dry dock having a caisson, a counterbalancing tank, a pump for pumping water from said caisson, a discharge pipe connected to said pump leading to said counterbalancing tank.

5. In a dry dock construction, a floating dry dock having a caisson, a counterbalancing tank, a supporting structure for said tank, connections between said floating dock and said tank, a pump for pumping water from said caisson, said pump having a discharge pipe connected thereto, said discharge pipe having a flexible portion leading to said counterbalancing tank.

6. In a dry dock construction, a pair of parallel abutments, a floating dry dock between said abutments and maintained in position thereby, said dock having a caisson, a counterbalancing tank, a supporting structure for said counterbalancing tank, connections between said tank and said dock, and means for pumping water from said caisson into said counterbalancing tank.

7. In a dry dock construction, a pair of abutments, a dry dock positioned between said abutments, devices carried by said dry dock bearing against said abutment, a counterbalancing tank, a supporting structure for said counterbalancing tank, said devices upon said dock also engaging said supporting structure, connections between said tank and said dock, a caisson forming a part of said dock, and means for pumping water from said caisson into said tank.

8. In a dry dock construction, a pair of abutments, a floating dry dock positioned between said abutments, said dry dock comprising a plurality of caissons and side structures, a counterbalancing tank, connections between said side structures of said dock and said tank, and means for pumping water from said caisson into said tank.

9. In a dry dock construction, a floating dry dock consisting of a plurality of caissons and side structures carried by said caissons, hydraulic jacks carried by said side structures for supporting a vessel, a plurality of counterbalancing tanks arranged upon each side of said dock, supporting structures for said tanks, connections between said dock and said counterbalancing tanks, and means for pumping water from said caissons into said tanks.

10. In a dry dock construction the combination of supports, a caisson arranged between the supports and adapted to receive and support a ship thereon at times, tanks movably mounted on said supports and connected to the sides of the caisson, and means for simultaneously evacuating the caisson and filling the tanks to cause the caisson to rise and thereby lift a ship when one is upon it.

11. In a dry dock construction, the combination of supports, a caisson adapted to receive and support a ship arranged between the supports and adapted to be guided thereby in rising and falling, a plurality of tanks mounted for movement on said supports and connected to the sides of the caisson, and means for simultaneously evacuating the caisson and filling the tanks, to cause the caisson to rise and thereby lift a ship if one is upon it.

12. In a dry dock construction, the combination of supports, a caisson adapted to receive and support a ship arranged between the supports, a plurality of tanks connected to the sides of the caisson, means for supporting the tanks for movement on the supports in such a manner that they exert a lifting force on the caisson, and means for evacuating the caisson to increase its buoyancy and for filling the tanks to increase their lifting effect.

13. In a dry dock construction, the combination of supports, a caisson adapted to receive and support a ship and arranged between the supports for rising and falling movement, a plurality of tanks, means whereby the tanks are supported and connected to exert a lifting force upon the sides of the caisson, means to simultaneously empty the caisson of water and fill the tanks to cause the caisson to rise and lift a ship when one is upon it, and means to fill the caisson and empty the tanks to cause the caisson to sink.

In testimony whereof, I subscribe my signature.

THOMAS HAYDEN HAMILTON.